United States Patent
Lee et al.

(10) Patent No.: US 7,471,900 B2
(45) Date of Patent: Dec. 30, 2008

(54) PASSIVE OPTICAL NETWORK SYSTEM AND METHOD OF TRANSMITTING BROADCASTING SIGNAL IN SAME

(75) Inventors: Moon Seop Lee, Daejeon (KR); Byung Tak Lee, Gyeonggi-do (KR); Hyun Seo Kang, Gwangjoo (KR); Jai Sang Koh, Gwangjoo (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 390 days.

(21) Appl. No.: 11/286,966

(22) Filed: Nov. 22, 2005

(65) Prior Publication Data

US 2006/0120728 A1    Jun. 8, 2006

(30) Foreign Application Priority Data

Dec. 8, 2004   (KR) .................. 10-2004-0102954
Jul. 6, 2005    (KR) .................. 10-2005-0060875

(51) Int. Cl.
*H04J 14/00*   (2006.01)
*H04J 14/02*   (2006.01)
*H04B 10/00*   (2006.01)

(52) U.S. Cl. ................ 398/70; 398/71; 398/92; 398/157; 359/341.3

(58) Field of Classification Search ............ 398/72, 398/66, 67, 43, 79, 92, 157, 160, 173, 175, 398/63–64, 69–71, 97, 82, 140–141; 359/337.12, 359/341.3, 341.33
See application file for complete search history.

(56) References Cited

U.S. PATENT DOCUMENTS 5,574,589 A    11/1996   Feuer et al.

(Continued)

FOREIGN PATENT DOCUMENTS

JP          3-87727           4/1991

(Continued)

OTHER PUBLICATIONS

Suyama et al. "Bidirectional Transmission Scheme Using Intensity Modulation of 1.48 μm Pump Laser Diode for Erbium Doped Fiber Amplifier", Electronics Letters, Jan. 3, 1991; vol. 27. No. 1 pp. 89-91.*

(Continued)

*Primary Examiner*—M. R. Sedighian
(74) *Attorney, Agent, or Firm*—Blakely, Sokoloff, Taylor & Zafman LLP

(57) ABSTRACT

Provided are a passive optical network system and a method of transmitting a broadcasting signal in the same system. A central office (CO) generates a broadcasting signal and a downstream optical data signal using a coding method guaranteeing a run-length, multiplexes the downstream optical data signal and the broadcasting signal, and transmits the multiplexed downstream optical data signal and broadcasting signal. A remote node (RN) transmits the multiplexed downstream optical data signal and broadcasting signal received from the CO to one or more optical network units (ONUs). A gain medium, which is located on a transmission line between the CO and the RN, amplifies the broadcasting signal using the downstream optical data signal as a pump light source. Accordingly, a high gain can be obtained by amplifying the broadcasting signal using the gain medium located on the transmission line without a separate pump light source.

6 Claims, 2 Drawing Sheets

U.S. PATENT DOCUMENTS 7,333,518 B2 * 2/2008 Sakai et al. ................. 370/516
2004/0131358 A1 * 7/2004 Jung et al. .................... 398/72

FOREIGN PATENT DOCUMENTS

| JP | 4-22925 | 1/1992 |
| JP | 2000-151521 | 5/2000 |
| JP | 2003-134056 | 5/2003 |
| JP | 2004-215247 | 7/2004 |
| KR | 1997-0062728 | 9/1997 |
| KR | 10-2004-0062327 | 7/2004 |

OTHER PUBLICATIONS

"Operational Demonstration and Filter Alignment Study of Multiple Boradcast Video Delivery ona WDM Passive Optical Network", K. Reichmann, et al., IEEE Photonics Technology Letters, vol. 10, No. 9, Sep. 1998, pp. 1331-1333.

"Bidirectional Transmission Scheme Using INtensity Modulation of 1-48um Pump Laser Diode for Erbium-Doped Fibre Amplifier", Electronics Letters, Jan. 3, 1991; vol. 27. No. 1 pp. 89-91.

* cited by examiner

PASSIVE OPTICAL NETWORK SYSTEM AND METHOD OF TRANSMITTING BROADCASTING SIGNAL IN SAME

CROSS-REFERENCE TO RELATED PATENT APPLICATION

This application claims the benefit of Korean Patent Application No. 10-2004-0102954, filed on Dec. 8, 2004 and 10-2005-0060875, filed on Jul. 6, 2005, in the Korean Intellectual Property Office, the disclosure of which are incorporated herein in their entirety by reference.

BACKGROUND OF THE INVENTION

1. Field of the Invention

The present invention relates to a passive optical network system and a method of transmitting a broadcasting signal in the same system, and more particularly, to a passive optical network system and a method of transmitting a broadcasting signal by amplifying the signal without a separate pump light source.

2. Description of the Related Art

Accompanying an increase in data required for high quality broadcasting and games, a demand for optical fiber data transmission has increased in subscriber networks. In particular, to simultaneously satisfy bulk multimedia data requirements and high quality broadcasting demand, hundreds of megabytes of data per second and multiple high quality broadcasting channels are transmitted to each subscriber in an optical subscriber network.

FIG. 1 is a block diagram of a conventional passive optical network system.

Referring to FIG. 1, the passive optical network system includes a central office (CO) 100, a plurality of optical network units (ONUs) 120, and a remote node (RN) 110, which connects the CO 100 to each of the plurality of ONUs 120, distributes optical data signals and broadcasting signals, and multiplexes upstream optical signals. The CO 100, the plurality of ONUs 120, and the RN 110 are connected to each other via optical cables 130 and 132.

The CO 100 includes a transmitter for broadcast ($TX_{BC}$) 102 for generating a broadcasting signal, an optical amplifier 104 for compensating for a transmission loss in an optical transmission line when transmission is performed, an optical transceiver for data ($OTRX_{data}$) 106 generating data signals and receiving data signals from the plurality of ONUs 120, and a wavelength multiplexer (MUX) 108 for multiplexing the broadcasting signal and the data signal.

The RN 110 distributes a downstream data signal and a broadcasting signal received from the CO 100 via the optical cable 130 to each of the plurality of ONUs 120 and transmits upstream data signals received from the plurality of ONUs 120 to the CO 100 by multiplexing the upstream data signals.

Each ONU 120 includes a wavelength multiplexer/demultiplexer (MUX/DEMUX) 122 for demultiplexing the downstream data signal and the broadcasting signal transmitted from the CO 100 via the RN 110, a receiver for broadcast ($RX_{BC}$) 126 for receiving the broadcasting signal, and an optical transceiver for data ($OTRX_{data}$) 124 for receiving the downstream data signal and transmitting an upstream data signal.

This scheme is detailed in a research paper entitled "Operational demonstration and filter alignment study of multiple broadcast video delivery on a WDM passive optical network", IEEE Photonics Technology Letters, Vol. 10, No. 9, pp 1331-1333, September 1998.

In the conventional passive optical network system illustrated in FIG. 1, the optical amplifier 104 for compensating for a transmission loss of a broadcasting signal is used in the CO 100. However the optical amplifier 104 is very expensive, and since the optical amplifier 104 is configured using various parts, its configuration is complicated, resulting in a complicated system configuration.

A research paper and a patent detailing a structure of amplifying a broadcasting signal in a low price passive optical network by using only a gain medium without using an optical amplifier in order to solve the problem are outlined as follows:

In the research paper entitled "Bidirectional transmission scheme using intensity modulation of 1.48 μm pump laser diode for erbium-doped fiber amplifier", Electronics Letters 3rd, Vol. 27, No. 1, pp 89-91, 1991, a scheme of using a data light source having a wavelength of 1.48 μm, using a signal obtained by 5 MHz phase modulating the wavelength as an optical data signal by transmitting the obtained signal to ONUs, and simultaneously using the obtained signal as a pump light source of a broadcasting signal in a gain medium is suggested. However, in this case, since the data light source is phase-modulated, a data transmission rating is low in actual use, and since a phase modulator is included, the system configuration is complicated, resulting in a cost increase of a data transmitter.

The U.S. patent entitled "Passive Optical Network System providing simultaneously both broadcasting service and data service", US2004/0131358 A1 suggests a scheme of amplifying a broadcasting signal using a gain medium of an RN by transmitting a pump light source with a data signal and the broadcasting signal in a CO. However, in this case, since a pump light source is used, costs increase.

SUMMARY OF THE INVENTION

The present invention provides a system and method for transmitting a broadcasting signal by amplifying the signal using a gain medium located on a transmission line between a central office (CO) and a remote node (RN) of a passive optical network system without a separate pump light source.

According to an aspect of the present invention, there is provided a passive optical network system comprising: a central office (CO) generating a broadcasting signal and a downstream optical data signal using a coding method guaranteeing a run-length, multiplexing the downstream optical data signal and the broadcasting signal, and transmitting the multiplexed downstream optical data signal and broadcasting signal; a remote node (RN) transmitting the multiplexed downstream optical data signal and broadcasting signal received from the CO to one or more optical network units (ONUs); and a gain medium, which is located on a transmission line between the CO and the RN and amplifies the broadcasting signal using the downstream optical data signal as a pump light source.

According to another aspect of the present invention, there is provided a method of transmitting a broadcasting signal in a passive optical network system comprising a central office (CO), a remote node (RN), and one or more optical network units (ONUs), the method comprising: generating, by the CO, the broadcasting signal and a downstream optical data signal using a coding method guaranteeing a run-length, multiplexing the downstream optical data signal and the broadcasting signal, and transmitting the multiplexed downstream optical data signal and broadcasting signal; amplifying the broadcasting signal using the downstream optical data signal as a pump light source between the CO and the RN; and transmitting, by the RN, the multiplexed downstream optical data signal and broadcasting signal to one or more relevant ONUs.

Accordingly, a high gain can be obtained by amplifying a broadcasting signal using a gain medium located on a transmission line without a separate pump light source.

DETAILED DESCRIPTION OF THE INVENTION

A passive optical network system and a broadcasting signal transmission method according to embodiments of the present invention will now be described in detail with reference to the accompanying drawings.

Figure 1:
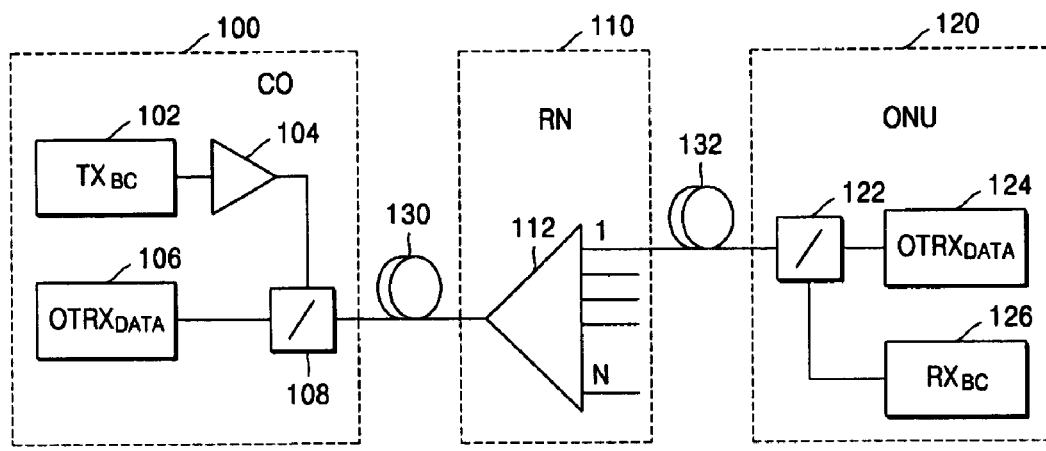
FIG. 1 is a block diagram of a conventional passive optical network system.
Figure 2:
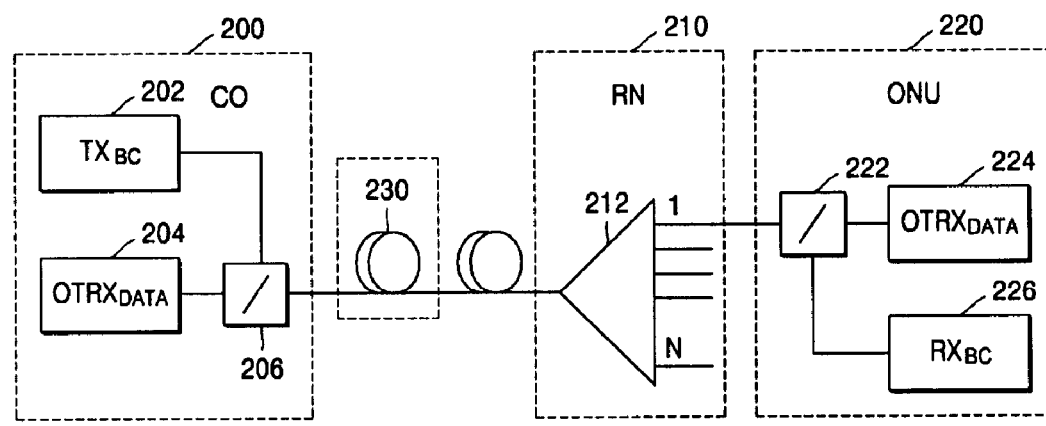
FIG. 2 is a block diagram of a passive optical network system according to an embodiment of the present invention.

FIG. 2 is a block diagram of a passive optical network system according to an embodiment of the present invention.

Referring to FIG. 2, the passive optical network system includes a central office (CO) 200, a remote node (RN) 210, one or more optical network units (ONUs) 220, and a gain medium 230.

The CO 200 includes a transmitter for broadcast ($TX_{BC}$) 202, an optical transceiver for data ($OTRX_{data}$) 204, and a multiplexer (MUX) 206. The $TX_{BC}$ 202 includes a light source generating a broadcasting signal to be provided to the ONUs 220, and the $OTRX_{data}$ 204 generates a downstream optical data signal using a coding method guaranteeing a run-length. The downstream optical data signal has a magnitude and a wavelength suitable for amplifying the broadcasting signal through the gain medium 230 to have one wavelength or a plurality of wavelengths different from the broadcasting signal.

The MUX 206 multiplexes the broadcasting signal generated by the $TX_{BC}$ 202 and the downstream optical data signal generated by the $OTRX_{data}$ 204 and transmits the multiplexed downstream optical data signal and broadcasting signal downstream. The $OTRX_{data}$ 204 receives upstream optical data signals generated by the ONUs 220 and transmitted via the RN 210.

The CO 200, the RN 210, and the ONUs 220 are connected to each other via a single mode fiber, and the gain medium 230 is located in an output section of the CO 200, an input section of the RN 210, or a transmission line connecting the CO 200 and the RN 210. The gain medium 230 amplifies the broadcasting signal using the downstream optical data signal generated by the $OTRX_{data}$ 204 as a pump light source.

The RN 210 is connected to the ONUs 220 and distributes the multiplexed broadcasting signal and downstream optical data signal received from the CO 200 to the ONUs 220. The RN 210 also multiplexes the upstream optical data signals transmitted from the ONUs 220 and transmits the multiplexed upstream optical data signal to the CO 200. To do this, the RN 210 includes a multiplexer/demultiplexer (MUX/DEMUX) 212 such as a splitter, an array wavelength grating (AWG), a waveguide grating, a grating, or a coupler.

Each ONU 220 includes a DEMUX 222 demultiplexing the broadcasting signal and the downstream optical data signal received from the RN 210, a receiver for broadcast ($RX_{BC}$) 226 receiving the broadcasting signal, and an $OTRX_{data}$ 224 receiving the downstream optical data signal and transmitting the upstream optical data signal.

Figure 3:
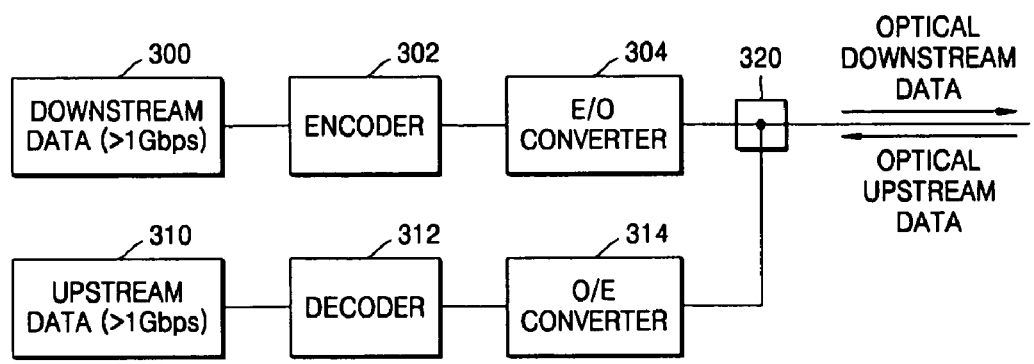
FIG. 3 is a block diagram of an optical transceiver for data ($OTRX_{data}$) of a central office (CO) of FIG. 2.

FIG. 3 is a block diagram of the $OTRX_{data}$ 204 of the CO 200 of FIG. 2.

Referring to FIG. 3, the $OTRX_{data}$ 204 of the CO 200 includes a downstream optical signal generator 300, an encoder 302, an electrical/optical (E/O) converter 304, an upstream signal receiver 310, a decoder 312, an optical/electrical (O/E) converter 314, and a signal selector 320.

For a downstream optical data signal, the downstream optical signal generator 300 generates a downstream data signal, the encoder 302 encodes the downstream optical data signal so that a run-length is guaranteed, and the E/O converter 304 converts the downstream data signal, which is an electrical signal, to a downstream optical data signal. Then the signal selector 320 selects the downstream optical data signal and transmits the downstream optical data signal downstream.

For an upstream optical data signal, when an optical data signal generated by the ONU 220 is received via the RN 210, the signal selector 320 transmits the upstream optical data signal to the O/E converter 314. The O/E converter 314 converts the optical signal to an electrical signal, the decoder 312 decodes the electrical signal, and the upstream signal receiver 310 receives the decoded signal.

Figure 4:
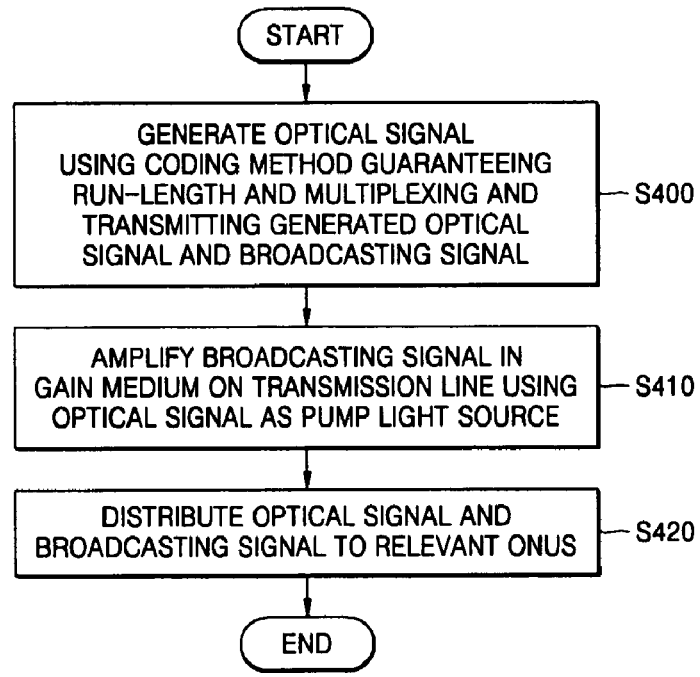
FIG. 4 is a flowchart illustrating a method of transmitting a broadcasting-signal in a passive optical network system according to an embodiment of the present invention.

FIG. 4 is a flowchart illustrating a method of transmitting a broadcasting-signal in a passive optical network system according to an embodiment of the present invention.

Referring to FIG. 4, in operation S400, a CO generates a broadcasting signal and a downstream optical data signal using a coding method guaranteeing a run-length, multiplexes the downstream optical data signal and the broadcasting signal, and transmits the multiplexed downstream optical data signal and broadcasting signal downstream. In operation S410, a gain medium, which is located between the CO and an RN, amplifies the broadcasting signal using the downstream optical data signal as a pump light source. In operation S420, the RN transmits the multiplexed downstream optical data signal and broadcasting signal, which are amplified and transmitted by the gain medium, to one or more relevant ONUs.

As described above, according to embodiments of the present invention, receiving sensitivity of an ONU can be improved by transmitting downstream a downstream optical data signal from a CO using a coding method of guaranteeing a run-length of over several MHz and by amplifying a downstream broadcasting signal using a gain medium using the downstream optical data signal as a pump light source. Thus, a stable optical link can be configured, and an economical passive optical network system can be implemented.

While this invention has been particularly shown and described with reference to preferred embodiments thereof, it will be understood by those skilled in the art that various changes in form and details may be made therein without departing from the spirit and scope of the invention as defined by the appended claims. The above-described embodiments should be considered in a descriptive sense only and are not for purposes of limitation. Therefore, the scope of the invention is defined not by the detailed description of the invention but by the appended claims, and all differences within the scope will be construed as being included in the present invention.

What is claimed is:

1. A passive optical network system comprising:
   a central office (CO) generating a broadcasting signal and a downstream optical data signal using a coding method guaranteeing a run-length, multiplexing the downstream optical data signal and the broadcasting signal, and transmitting the multiplexed downstream optical data signal and the broadcasting signal;

a remote node (RN) transmitting the multiplexed downstream optical data signal and the broadcasting signal received from the CO to one or more optical network units (ONUs); and a gain medium, which is located on a transmission line between the CO and the RN and amplifies the broadcasting signal using the downstream optical data signal as a pump light source.

2. The system of claim 1, wherein each ONU demultiplexes the multiplexed downstream optical data signal and the broadcasting signal received from the RN.

3. The system of claim 1, wherein the CO comprises:

a transmitter for broadcast (TXac) generating a broadcasting signal;

an optical transceiver for data (OTRXdata) generating the downstream optical data signal using the coding method guaranteeing the run-length; and a multiplexer (MUX) multiplexing the broadcasting signal and the downstream optical data signal.

4. The system of claim 1, wherein each ONU generates an upstream optical data signal, the RN multiplexes upstream optical data signals received from one or more ONUs and transmits the multiplexed upstream optical data signal to the CO, and the CO receives the upstream optical data signal.

5. A method of transmitting a broadcasting signal in a passive optical network system comprising a central office (CO), a remote node (RN), and one or more optical network units (ONUs), the method comprising:

generating, by the CO, the broadcasting signal and a downstream optical data signal using a coding method guaranteeing a run-length, multiplexing the downstream optical data signal and the broadcasting signal, and transmitting the multiplexed downstream optical data signal and the broadcasting signal;

amplifying the broadcasting signal using the downstream optical data signal as a pump light source between the CO and the RN; and transmitting, by the RN, the multiplexed downstream optical data signal and broadcasting signal to one or more relevant ONUs.

6. The method of claim 5, further comprising demultiplexing, by each ONU, the multiplexed downstream optical data signal and the broadcasting signal received from the RN.

* * * * *